United States Patent Office 3,556,773
Patented Jan. 19, 1971

3,556,773
REFINING OF METALS
Hugh Willmott Grenfell, Glamorgan, Wales, assignor to The Steel Company of Wales Limited, Glamorgan, Wales, a British company
No Drawing. Filed Sept. 25, 1967, Ser. No. 671,186
Claims priority, application Great Britain, Sept. 26, 1966, 42,900/66; Feb. 13, 1967, 6,709/67
Int. Cl. C21c 5/32; C22b 15/00
U.S. Cl. 75—51                    7 Claims

ABSTRACT OF THE DISCLOSURE

The invention is for the refining of metals and comprises subjecting a melt of the metal to an oxygen treatment within a refining vessel by injecting into the vessel a flame fed by streams of oxygen and liquid carbonaceous fuel wherein particles of solids material are entrained within the stream of liquid carbonaceous fuel supplied to the flame. The invention particularly relates to the refining of iron to steel. The solids material may be lime or a mixture of lime with other materials such as calcium carbide, coal and fluorspar. The solids material has a particle size not more than $\frac{1}{8}''$ and preferably $\frac{1}{16}''$ to 200 B.S.S. mesh and is formed into a slurry with the liquid fuel.

---

This invention relates to the refining of metals and has particular reference to improvements in the refining of metals, such as steel in an L.D. or a B.O.F. converter or in an open hearth furnace as described in our copending British application No. 6,847/66 corresponding to U.S. application Ser. No. 615,310 filed Feb. 13, 1967.

According to the present invention, there is provided a process for the treatment or refining of metals which process comprises subjecting a melt of the metal to an oxygen treatment within a refining vessel by injecting into the vessel a flame fed by streams of oxygen and liquid carbonaceous fuel wherein particles of solids material are entrained within the stream of liquid carbonaceous fuel supplied to the flame.

The present invention also includes a process for the production of steel in an open hearth furnace or in a top blown converter which process comprises injecting into the converter vessel a flame fed by streams of oxygen and liquid carbonaceous fuel wherein the particles of solids material are entrained within the stream of liquid carbonaceous fuel supplied to the flame.

The process of the invention may be employed in the refining of iron to steel or in the refining of copper or zinc.

The process of the present invention provides a means for dynamically injecting into a melt of the metal being refined various solids material either singly or as a mixture to produce, initiate or enhance the various reactions necessary for refining the metal.

Typical of the particulates solids materials that may be entrained with the stream of liquid carbonaceous fuel are lime, fluxes, iron ore, or scale, either singly or in combination or as a mixture. Various iron oxides may form a constituent of the solids material entrained with the stream of liquid carbonaceous fuel when the metal being refined is iron, and the iron oxide may be in the form of scale, iron ore and various flue dusts. A flux for slag, calcium carbide, coal or other solid carbonaceous material and fluorspar may also be incorporated in the liquid carbonaceous fuel.

The solids material to be entrained in the stream of liquid carbonaceous fuel is preferably finely divided, that is to say, has a particle size of less than one eighth of an inch and preferably has a particle size within the range of one-sixteenth of an inch to 200 B.S. mesh and typically 40 to 60 B.S. mesh. The material is formed into a slurry with the liquid carbonaceous fuel and the slurry is supplied to the nozzles from which the streams feeding the flame issues. The nozzles may be part of a multi-jet blowing lance used to inject a mixture of oxygen and fuel oil into a steel refining apparatus.

Where a flux for the slag is to be entrained in the liquid carbonaceous fuel, the flux may be made dynamically and injected into the metal at high velocity thus controlling the refining of the melt to a high degree. In the refining of iron considerably more scrap, scale or iron ore may be used as calculated from the heat of combustion of the quantity of the liquid carbonaceous fuel and the quantity of heat required to raise the scrap of tapping temperature. However, since the products of combustion as well as the oxygen is blown into the bath of molten material further reactions between the carbon dioxide in these gases and the constituents of the bath may occur which are endothermic and, therefore, the additions must be calculated from a consideration of the heat balance over the process.

It is preferred that there is an excess of oxygen over the quantity of oxygen required to effect complete combustion of the fuel and the excess may be greater than 1000% of that required to obtain complete combustion of the fuel. Alternatively, the excess of oxygen may typically be within the range 150–200%.

The liquid carbonaceous fuel may be a hydrogen fuel oil or a coke even tar of low sulphur content and the streams of oxygen and liquid fuel may be injected into the refining vessel by means of multi-jet blowing nozzle such as that forming the subject of British complete specification No. 1,021,099 corresponding to U.S. Pat. 3,313,-535. It is desirable that during the refining reaction, the flame should not impinge upon the melt in order to reduce contamination of the melt by the introduction of sulphur.

A typical fuel oil is a low sulphur residual fuel oil. Where lime is to be entrained to form a slurry, the fuel oil may have a 200 seconds Redwood No. 1 viscosity and the proportion of lime entrained would be 30 to 50% preferably 45% by wt. of the weight of the oil.

The oxygen may be preheated in the nozzle or in the flame since it will be appreciated that in the process, using a conventional top blown converter as hitherto employed, the oxygen used is cold and in fact will be further cooled by the adiabatic expansion which takes place when the oxygen is emitted from the nozzle and this constitutes a considerable drain on the heat produced in the reactions of the process and thus limits the quantity of any scrap which may be charged to the melt prior to or during the refining process.

A fuel/oil/particulate material mixture may be injected into the refining vessel by means of a multi-jet blowing nozzle which may be incorporated at the end of a blowing lance such as that described and claimed in our complete specification No. 1,021,099, which comprises an elongate body member having a fuel supply conduit centrally located therein, and an oxygen supply conduit surrounding said fuel supply conduit to provide an annular passage for the supply of oxygen wherein the body member is provided with a delivery nozzle at one end thereof formed with a plurality of discharge orifices and communicating with said oxygen supply conduit through a plurality of oxygen supply pipes disposed at an angle to the longitudinal axis of the lance, and wherein the fuel supply conduit is provided at its outlet end with a plurality of fuel supply pipes extending therefrom and each having its end portion situated in a corresponding oxygen supply pipe so that oxygen flowing through said supply pipe to the discharge orifices will flow in an annulus around the end of the corresponding fuel supply pipes, whereby fuel will be entrained in the oxygen supplies when discharged from the discharge orifices.

Some modification of the lance is, however, necessary in order to adapt such a lance for use with an L.D. or B.O.F. steel making apparatus. The length of the lance is substantially increased and consequentially there is a possibility of excessive cooling of the fuel oil due to its travel down the lance. This cooling may be prevented by lagging the fuel oil supply pipe or by providing an additional pipe outside the fuel supply pipe leaving a gap so as to provide a resistance to heat transfer.

In use, with an open top blown converter, the lance is located towards the open top of the converter and the oxygen supply and the fuel oil supply to the lance is turned on. The mixture ignites at the nozzle outlet to provide a flame extending some 1.5 to 2 ft. from the discharge orifices at the end of the lance. The lance is then lowered so that the discharge orifices are within 4 to 6 ft. of the surface of the melt, that is to say, so that the flame per se does not impinge upon the surface of the melt. The fuel oil supply is then substituted by a slurry of particulate solids material in fuel oil. The supply of oxygen slurry treatment is continued until the refining operation is complete. The slurry is preferably supplied under pressure so that the momentum of the particles of solids material is sufficient to carry them into the melt of the material itself.

Steel with a phosphorous content of less than 0.015% by weight can be made from hot metal containing from up to 0.08% by weight of phosphorous and which after refining results in a finishing slag having an iron content of less than 25%.

The higher hot metal phosphorous levels which can be accommodated by the process by the present invention can be attributed to the beneficial physical and chemical features of incorporating particulate solids materials within the liquid carbonaceous fuel supply to the flame in the refining vessel. These features are:

(i) Increased reaction rate of lime entrained in the liquid carbonaceous fuel by virtue of the very large surface area of the finely divided lime as compared with lump lime.

(ii) Direct introduction of lime into the reaction zone, caused by the impingement of oxygen on the surface of the melt after burning.

(iii) The momentum of the particles ejected from the nozzle of the lance is greater than the momentum of the particles of the gas at the melt surface.

(iv) The process of the invention assists in the formation of slag to assist in the removal of the phosphorous from the steel melt.

(v) The process of the invention allows continuous control of the slag chemistry and control of the slag basicity.

The process of the present invention has been found to have all the virtues of a top blown oxygen/powdered lime steel making process without the drawbacks of erosion of the lance and ancillary pipe work by the powdered lime and the loss of lime powder through the mouth of the vessel and the attack of the vessel lining by the powdered lime.

The blowing procedure follows exactly the same procedure as that of the L.D. process with the exception that the fuel oil slurry with a solids refining material is burned at the lance during the blowing. The rate of lime injection is an important factor in the physical and chemical control of the slag. The lime quantity in pounds per ton of hot metal is calculated from the required slag basicity, lime purity and lining wear. The required slag basicities are calculated by the following relation:

$$\text{Slag basicity} = \frac{\text{Percent CaO}}{1.86\% \text{ SiO}_2 + 1.18\% \text{ P}_2\text{O}_5}$$

Favourable chemical conditions for foaming are achieved if a slag basicity of 1.0 maintained as long as possible, and the rate of lime injection into the slurry is varied to satisfy this condition until two-thirds of the way through the blow; the remaining lime to give the final basicity is then added during the last third of the blow.

The method of operation is as follows:

The lance is lowered to just inside the vessel and the oxygen is turned on in sufficient quantity to burn the fuel oil. The fuel oil is turned on and ignition is immediate. The lance is then lowered to the normal blowing position and the oxygen is turned up to the blowing quantity and some flux is added to the melt. The fuel oil slurry, containing substantially 45% by weight of lime is then turned on to replace the supply of fuel oil. Foaming takes place within the reaction vessel within 2 to 6 minutes and the degree of foaming may be controlled by lowering the lance and turning down the oxygen flow. Sufficient slag making constituents are incorporated in the slurry during the first two thirds of the blow to maintain the slag basicity in the vessel to about 1.0. The remainder of the lime is then added during the last third of the blow to give a finished slag basicity of 1.4 to 1.8. Finally, the slurry is turned off and the system flushed out with clean fuel oil which is in turn flushed out with steam.

I claim:

1. A process for the oxygen treatment of one of the metals of iron, copper and zinc comprising:
    (A) creating a flame with streams of oxygen and liquid carbonaceous fuel, said oxygen being supplied in excess of that required for complete combustion of said fuel;
    (B) dispersing a solid particulate material within the stream of carbonaceous fuel to create a slurry therewith, said particulate material comprising at least one of lime, slag flux, iron ore, iron scale, calcium carbide, coal, solid carbonaceous materials and fluorspar;
    (C) directing said flame into a vessel containing a melt of said metal and;
    (D) causing only products of combustion and solid particulate material to impinge the melt until the metal has been refined.

2. A process as set forth in claim 1 wherein the oxygen is in an excess amount of from 150–200%.

3. A process as set forth in claim 1 wherein the oxygen is in an excess amount of about 1000%.

4. A process as set forth in claim 1 wherein the metal to be treated is iron and the particulate matter is iron oxide.

5. A process as set forth in claim 1 wherein said iron oxide is added in the form of at least one of scale, iron ore, and various flue dusts.

6. A process as set forth in claim 1 wherein the particulate solids are maintained at a momentum greater than that of the gas at the surface of the melt.

7. A process as set forth in claim 1 wherein iron is treated with a flux by feeding said flux at a rate sufficient to maintain the slag basicity of the metal at 1.0 for two/thirds of the melt and thereafter raising the basicity to between 1.4 and 1.8.

(References on following page)

References Cited

UNITED STATES PATENTS

| | | | |
|---|---|---|---|
| 57,969 | 9/1866 | Reese | 266—25X |
| 3,030,202 | 4/1962 | De Galocsy | 75—51 |
| 3,234,011 | 2/1966 | Rinesch | 75—60 |
| 3,323,907 | 6/1967 | Kurzinski | 75—60 |
| 3,376,130 | 4/1968 | Kootz et al. | 75—52 |
| 2,938,782 | 5/1960 | Toulmin, Jr. | 75—41 |

FOREIGN PATENTS

| | | | |
|---|---|---|---|
| 952,507 | 3/1964 | Great Britain | 75—60 |
| 970,116 | 9/1964 | Great Britain | 75—60 |
| 979,335 | 1/1965 | Great Britain | 75—60 |
| 1,453,442 | 8/1965 | France | 75—60 |

L. DEWAYNE RUTLEDGE, Primary Examiner

G. K. WHITE, Assistant Examiner

U.S. Cl. X.R.

75—52, 60, 72, 86